United States Patent
Akihisa

(10) Patent No.: US 9,151,231 B2
(45) Date of Patent: Oct. 6, 2015

(54) VARIABLE COMPRESSION RATIO TYPE ENGINE WITH FUEL CONTAINING ALCOHOL

(75) Inventor: Daisuke Akihisa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 624 days.

(21) Appl. No.: 13/499,096

(22) PCT Filed: Dec. 9, 2009

(86) PCT No.: PCT/JP2009/070933
§ 371 (c)(1),
(2), (4) Date: Mar. 29, 2012

(87) PCT Pub. No.: WO2011/070686
PCT Pub. Date: Jun. 16, 2011

(65) Prior Publication Data
US 2012/0234273 A1   Sep. 20, 2012

(51) Int. Cl.
*F02B 75/26* (2006.01)
*F02D 13/02* (2006.01)
*F02D 15/04* (2006.01)
(Continued)

(52) U.S. Cl.
CPC ........ *F02D 13/0238* (2013.01); *F02D 13/0269* (2013.01); *F02D 15/04* (2013.01); *F02D 19/084* (2013.01); *F02D 19/087* (2013.01); *F02D 41/0025* (2013.01); *F01L 1/143* (2013.01); *F01L 1/3442* (2013.01); *F01L 2001/0537* (2013.01); *F01L 2001/3443* (2013.01); *F01L 2001/34426* (2013.01); *F02D 2041/001* (2013.01);
(Continued)

(58) Field of Classification Search
CPC ................ Y02D 10/46; F01L 13/0015; F02D 2041/001; F02D 37/02; F02D 41/0002; F02D 13/0223; F02D 2200/0611; F02D 19/084; F02D 13/0215; F02D 15/00; F02D 41/005
USPC .............................. 123/431, 90.15, 48 R, 1 A
See application file for complete search history.

(56) References Cited

U.S. PATENT DOCUMENTS 8,342,143 B2 * 1/2013 Yoshioka et al. ........... 123/48 R
2008/0098990 A1   5/2008 Hiyoshi et al.
(Continued)

FOREIGN PATENT DOCUMENTS

JP    A-61-164037    7/1986
JP    A-2008-111375  5/2008
(Continued)

OTHER PUBLICATIONS

International Search Report issued in Application No. PCT/JP2009/070933; Dated Jan. 26, 2010 (With Translation).

*Primary Examiner* — Lindsay Low
*Assistant Examiner* — Long T Tran
(74) *Attorney, Agent, or Firm* — Oliff PLC

(57) ABSTRACT

An internal combustion engine which is provided with a variable compression ratio mechanism able to change a mechanical compression ratio and a variable valve timing mechanism able to control a closing timing of an intake valve. The expansion ratio is made higher at the time of engine low load operation compared with at the time of engine high load operation. A fuel containing alcohol is used as the fuel, and the expansion ratio at the time of engine low load operation is made to fall when an alcohol concentration in the fuel is high compared with when the alcohol concentration in the fuel is low.

10 Claims, 16 Drawing Sheets

(51) Int. Cl.
- *F02D 41/00* (2006.01)
- *F02D 19/08* (2006.01)
- *F01L 1/14* (2006.01)
- *F01L 1/344* (2006.01)
- *F01L 1/053* (2006.01)

(52) U.S. Cl.
CPC ....... *F02D2200/0611* (2013.01); *Y02T 10/142* (2013.01); *Y02T 10/36* (2013.01)

(56) References Cited

U.S. PATENT DOCUMENTS

| | | |
|---|---|---|
| 2010/0282216 A1 | 11/2010 | Hisaminato et al. |
| 2010/0294245 A1* | 11/2010 | Yoshioka et al. ........... 123/48 R |
| 2011/0271920 A1* | 11/2011 | Akihisa et al. ............. 123/90.15 |

FOREIGN PATENT DOCUMENTS

| | | |
|---|---|---|
| JP | A-2008-121592 | 5/2008 |
| JP | A-2008-128227 | 6/2008 |
| JP | A-2008-175127 | 7/2008 |
| JP | A-2008-208794 | 9/2008 |
| JP | A-2008-232008 | 10/2008 |
| JP | A-2009-047071 | 3/2009 |
| JP | A-2009-114947 | 5/2009 |
| JP | A-2009-115063 | 5/2009 |
| JP | A-2009-275573 | 11/2009 |
| JP | 2009-281303 A | 12/2009 |
| WO | WO 2009/091077 A1 | 7/2009 |

\* cited by examiner

Fig. 2
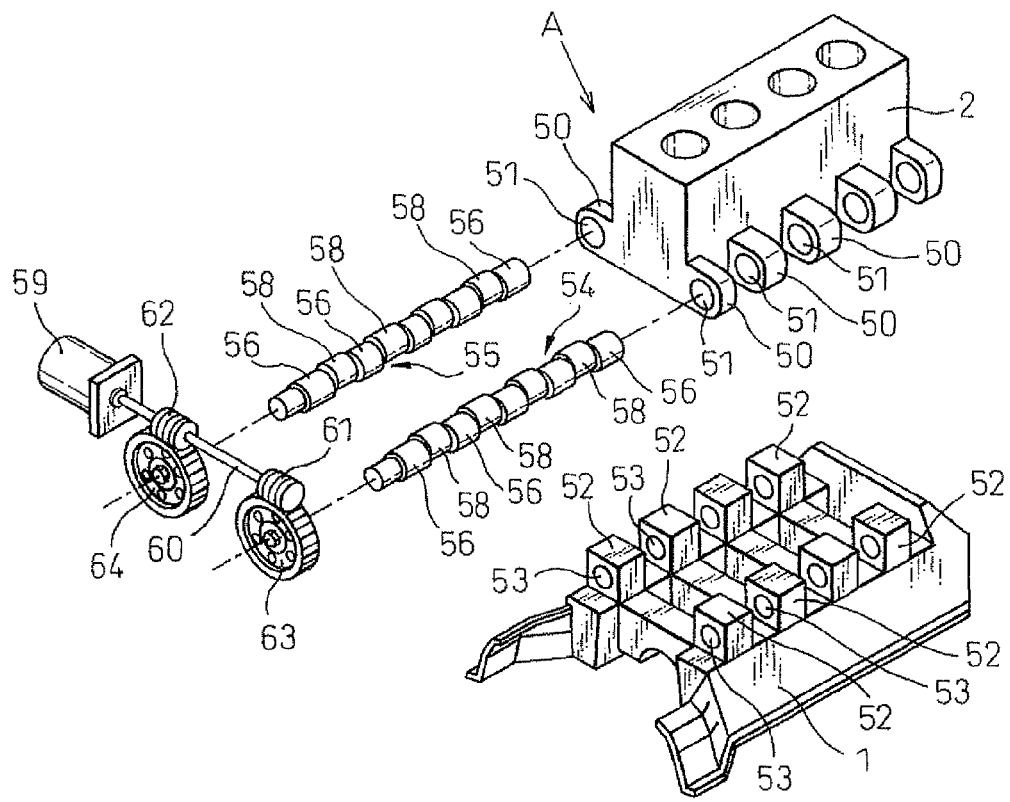
Fig. 3
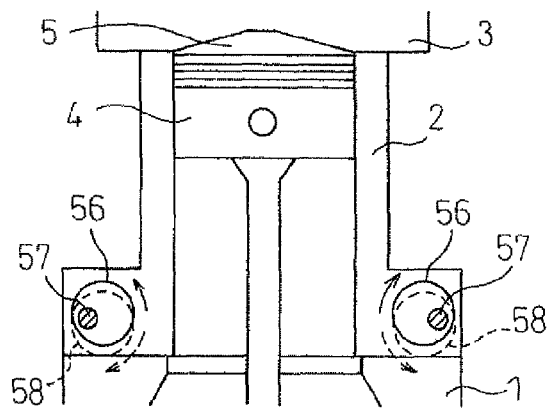
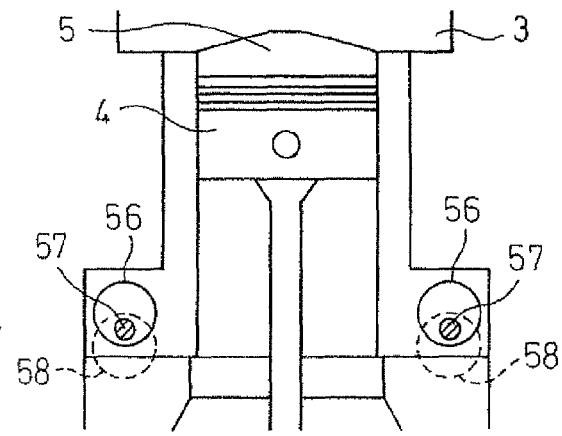

Fig.6
(A)
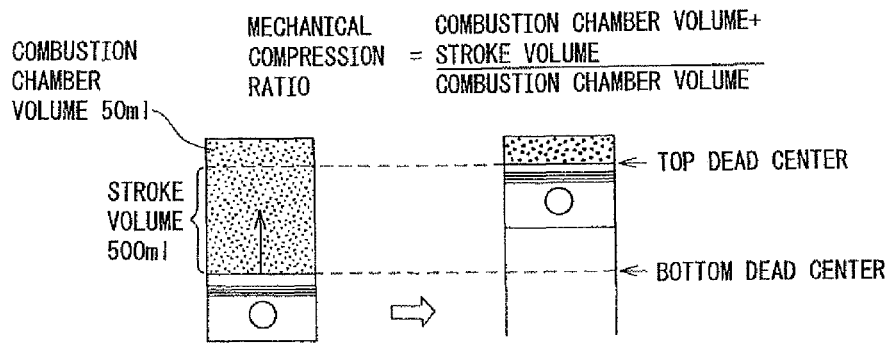
(B)
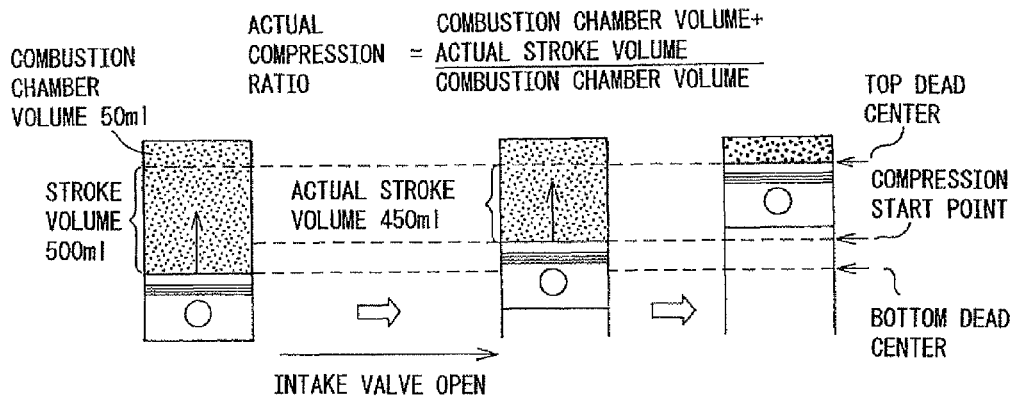
(C)
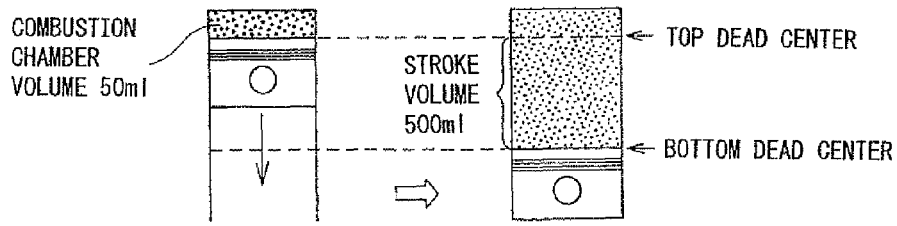

Fig.13
(A)
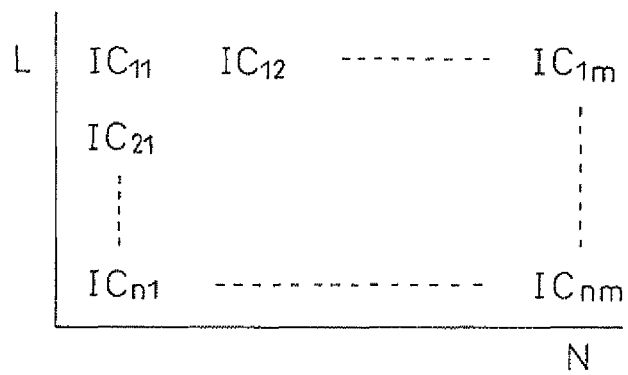
(B)
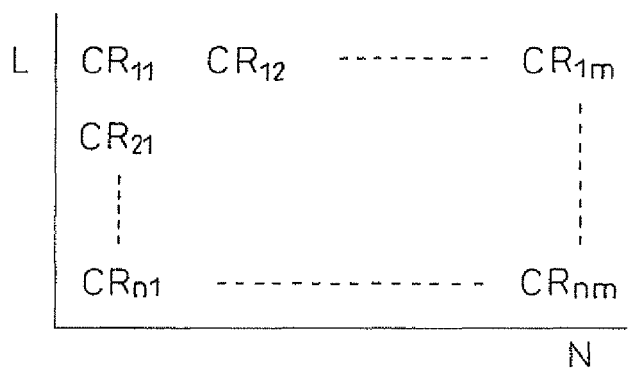
(C)
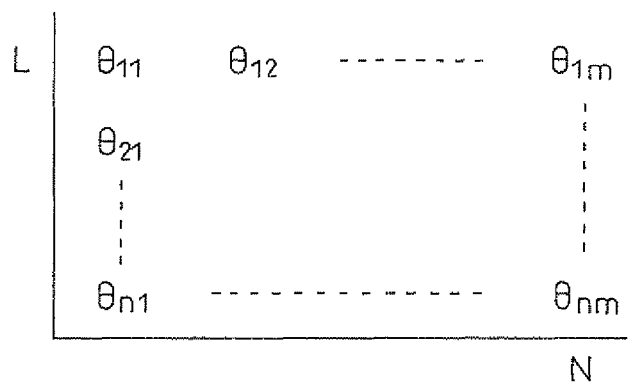

VARIABLE COMPRESSION RATIO TYPE ENGINE WITH FUEL CONTAINING ALCOHOL

TECHNICAL FIELD

The present invention relates to a spark ignition type internal combustion engine.

BACKGROUND ART

When using a fuel which contains alcohol as a fuel, the higher the alcohol concentration in the fuel, the higher the octane value and the harder it becomes for knocking to occur. Therefore, the higher the alcohol concentration in the fuel, the higher the compression ratio can be made. Therefore, there is known an internal combustion engine which is provided with a variable compression ratio mechanism which can change a mechanical compression ratio and a variable valve timing mechanism which can control a closing timing of the intake valve, which uses a fuel which contains alcohol as a fuel, and which raises the actual compression ratio the higher the alcohol concentration in the fuel (see Patent Literature 1).

CITATIONS LIST

Patent Literature

Patent Literature 1: Japanese Patent Publication (A) No. 2009-115063

SUMMARY OF INVENTION

Technical Problem

In this regard, if making a fuel like alcohol which contains oxygen burn, a large amount of water with a large specific heat is produced compared with when making usual gasoline burn and as a result the combustion temperature falls. If the combustion temperature falls, the combustion pressure falls and the expansion end pressure falls. Therefore, when using usual gasoline, the expansion end pressure becomes the atmospheric pressure or more, but when using a fuel which contains alcohol, even if raising the actual compression ratio, sometimes the expansion end pressure will end up falling to below the atmospheric pressure, that is, over expansion will end up occurring. However, if such over expansion occurs, the heat efficiency will greatly fall.

An object of the present invention is to provide a spark ignition type internal combustion engine which can prevent over expansion when using a fuel containing alcohol and thereby can secure a high heat efficiency.

Solution to Problem

According to the present invention, there is provided a spark ignition type internal combustion engine comprising a variable compression ratio mechanism able to change a mechanical compression ratio and a variable valve timing mechanism able to control a closing timing of an intake valve, and an expansion ratio is made higher at the time of engine low load operation compared with at the time of engine high load operation, wherein a fuel containing alcohol is used as a fuel, and the expansion ratio at the time of engine low load operation is made to fall when an alcohol concentration in the fuel is high compared with when the alcohol concentration in the fuel is low.

Advantageous Effects of Invention

At the time of engine low load operation, the expansion ratio is made higher compared with the time of engine high load operation, so when a fuel containing alcohol is used as fuel, there is a possibility of over expansion. In this case, the higher the alcohol concentration in the fuel, the more readily over expansion occurs. However, in the present invention, when the alcohol concentration in the fuel is high, the expansion ratio at the time of engine low load operation is made to fall compared with when the alcohol concentration in the fuel is low, so even when the alcohol concentration in the fuel is high, over expansion can be prevented from occurring.

BRIEF DESCRIPTION OF DRAWINGS

FIG. 2 is a disassembled perspective view of a variable compression ratio mechanism.

FIG. 3 is a side cross-sectional view of the illustrated internal combustion engine.

FIG. 6 is a view for explaining a mechanical compression ratio, actual combustion ratio, and expansion ratio.

FIG. 13 is a view which shows a map of the closing timing IC of the intake valve etc.

DESCRIPTION OF EMBODIMENTS

Figure 1:
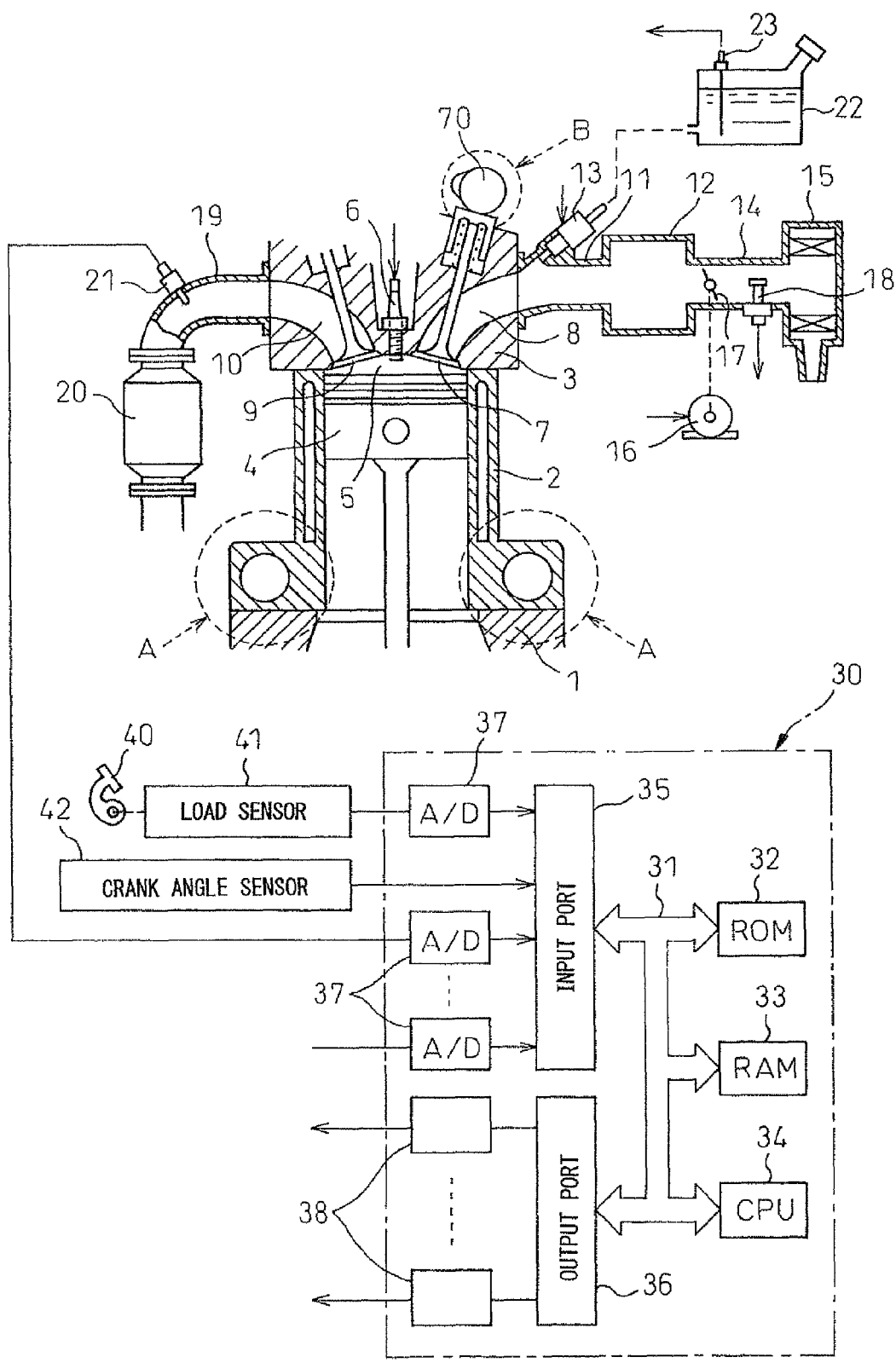
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. Each intake port 8 is connected through an intake branch pipe 11 to a surge tank 12, while each intake branch pipe 11 is provided with a fuel injector 13 for injecting fuel toward a corresponding intake port 8. Note that each fuel injector 13 may be arranged at each combustion chamber 5 instead of being attached to each intake branch pipe 11.

The surge tank 12 is connected through an intake duct 14 to an air cleaner 15, while the intake duct 14 is provided inside it with a throttle valve 17 which is driven by an actuator 16 and an intake air amount detector 18 which uses for example a hot wire. On the other hand, the exhaust port 10 is connected through an exhaust manifold 19 to a catalytic converter 20 which houses for example a three-way catalyst, while the exhaust manifold 19 is provided inside it with an air-fuel ratio sensor 21.

In the embodiment which is shown in FIG. 1, a fuel containing alcohol is used as fuel. The alcohol-containing fuel which is stored in a fuel tank 22 is fed to each fuel injector 13. In this embodiment according to the present invention, the alcohol concentration in the fuel used extends over a broad range from 0% to 85% or so, therefore the alcohol concentration in the fuel which is injected from the fuel injector 13 also changes over a broad range. Inside the fuel tank 22, an alcohol concentration sensor 23 is attached for detecting the alcohol concentration in the fuel which is injected from the fuel injector 13.

On the other hand, in the embodiment shown in FIG. 1, the connecting part of the crank case 1 and the cylinder block 2 is provided with a variable compression ratio mechanism A which is able to change the relative positions of the crank case 1 and cylinder block 2 in the cylinder axial direction so as to change the volume of the combustion chamber 5 when the piston 4 is positioned at compression top dead center and is further provided with an actual compression action start timing changing mechanism B which is able to change a start timing of an actual compression action. Note that in the embodiment shown in FIG. 1, this actual compression action start timing changing mechanism B is comprised of a variable valve timing mechanism which is able to control the closing timing of the intake valve 7.

The electronic control unit 30 is comprised of a digital computer which is provided with a ROM (read only memory) 32, RAM (random access memory) 33, CPU (microprocessor) 34, input port 35, and output port 36, which are connected with each other through a bidirectional bus 31. The output signal of the intake air amount detector 18 and the output signals of the air-fuel ratio sensor 21 and alcohol sensor 23 are input through corresponding AD converters 37 to the input port 35. Further, an accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Further, the input port 35 is connected to a crank angle sensor 42 which generates an output pulse every time the crankshaft rotates by for example 30°. On the other hand, the output port 36 is connected through the drive circuit 38 to each spark plug 6, each fuel injector 13, throttle valve drive actuator 16, variable compression ratio mechanism A, and variable valve timing mechanism B.

FIG. 2 is a disassembled perspective view of the variable compression ratio mechanism A which is shown in FIG. 1, while FIG. 3 is a side cross-sectional view of the illustrated internal combustion engine. Referring to FIG. 2, at the bottom of the two side walls of the cylinder block 2, a plurality of projecting parts 50 which are separated from each other by a certain distance are formed. Each projecting part 50 is formed with a circular cross-section cam insertion hole 51. On the other hand, the top surface of the crank case 1 is formed with a plurality of projecting parts 52 which are separated from each other by a certain distance and which fit between the corresponding projecting parts 50. These projecting parts 52 are also formed with circular cross-section cam insertion holes 53.

As shown in FIG. 2, a pair of cam shafts 54 and 55 is provided. Each of the cam shafts 54 and 55 has circular cams 56 fixed on it which is able to be rotatably inserted in the cam insertion holes 51 at every other position. These circular cams 56 are coaxial with the axes of rotation of the cam shafts 54 and 55. On the other hand, between the circular cams 56, as shown by the hatching in FIG. 3, extend eccentric shafts 57 arranged eccentrically with respect to the axes of rotation of the cam shafts 54 and 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 which are fastened to the cam shafts 54 and 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 separates from the crank case 1, the volume of the combustion chamber 5 when the piston 4 is positioned at compression top dead center increases, therefore by making the cam shafts 54 and 55 rotate, the volume of the combustion chamber 5 when the piston 4 is positioned at compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Gears 63 and 64 engaging with these worm gears 61 and 62 are fastened to ends of the cam shafts 54 and 55. In this embodiment, by driving the drive motor 59, it is possible to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
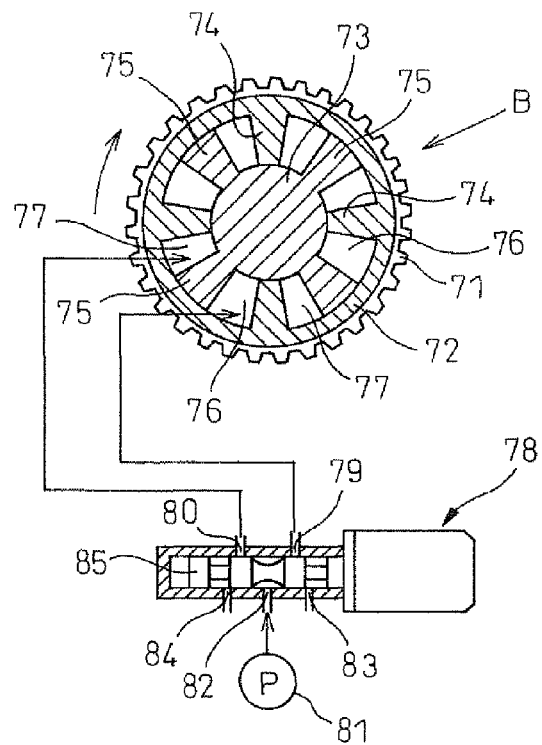
FIG. 4 is a view which shows a variable valve timing mechanism.

On the other hand, FIG. 4 shows the variable valve timing mechanism B which is attached to the end of the cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which is able to rotate together with an intake valve drive cam shaft 70 and rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72, the two sides of the vanes 75 being formed with advancing use hydraulic chambers 76 and retarding use hydraulic chambers 77.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 81, 82, 83, and 84.

To advance the phase of the cams of the intake valve drive cam shaft 70, in FIG. 4, the spool valve 85 is made to move to the right, working oil which is fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil which is fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrow.

When the shaft 73 is made to rotate relative to the cylindrical housing 72, if the spool valve 85 is returned to the neutral position which is shown in FIG. 4, the operation for relative rotation of the shaft 73 is stopped. The shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
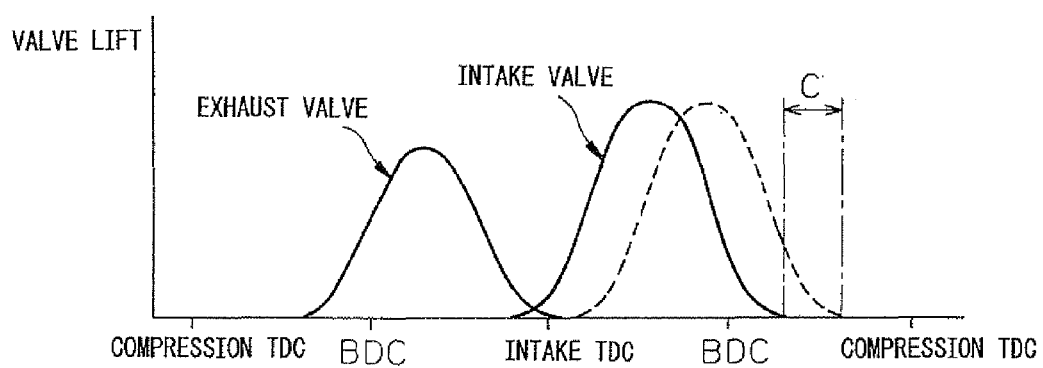
FIG. 5 is a view which shows the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B which is shown in FIG. 1 and FIG. 4 is one example. For example, a variable valve timing mechanism or other various types of variable valve timing mechanisms which are able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of each combustion chamber of 50 ml and a stroke volume of each piston of 500 ml. In these FIGS. 6(A), (B), and (C), the combustion chamber volume shows the volume of a combustion chamber when a piston is at compression top dead center.

FIG. 6(A) explains the mechanical compression ratio. The mechanical compression ratio is a value determined mechanically from a stroke volume of a piston and the combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual combustion ratio. This actual combustion ratio is a value determined from the actual stroke volume of the piston and the combustion chamber volume from when the compression action is actually started to when the piston reaches top dead center. This actual combustion ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual combustion ratio is expressed as above using the actual stroke volume. In the example shown in FIG. 6(B), the actual combustion ratio becomes (50 ml+450 ml)/50 ml=10.

FIG. 6(C) explains the expansion ratio. The expansion ratio is a value determined from the stroke volume of the piston and the combustion chamber volume at the time of an expansion stroke. This expansion ratio is expressed by the (combustion chamber volume+stroke volume)/combustion chamber volume. In the example shown in FIG. 6(C), this expansion ratio becomes (50 ml+500 ml)/50 ml=11.

Next, a superhigh expansion ratio cycle which is used in the present invention will be explained with reference to FIG. 7 and FIG. 8. Note that FIG. 7 shows the relationship between the theoretical thermal efficiency and the expansion ratio in the case of using gasoline as the fuel, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

Figure 7:
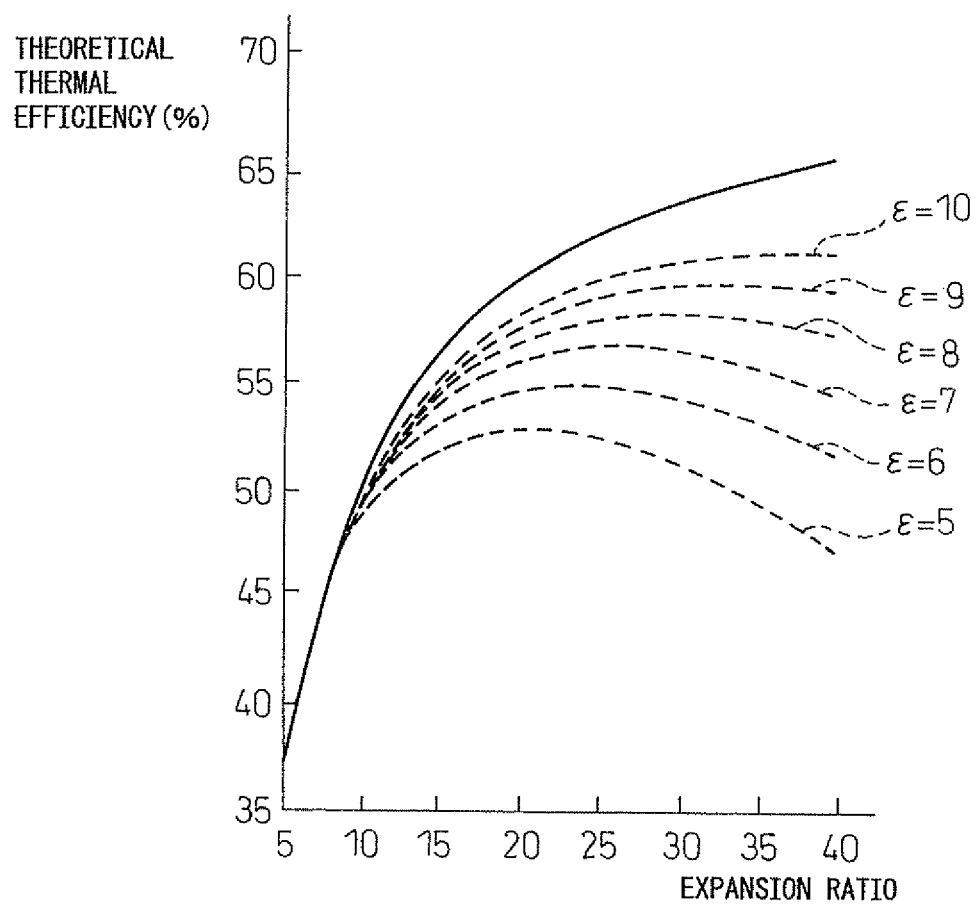
FIG. 7 is a view which shows the relationship between the theoretical thermal efficiency and the expansion ratio.
Figure 8:
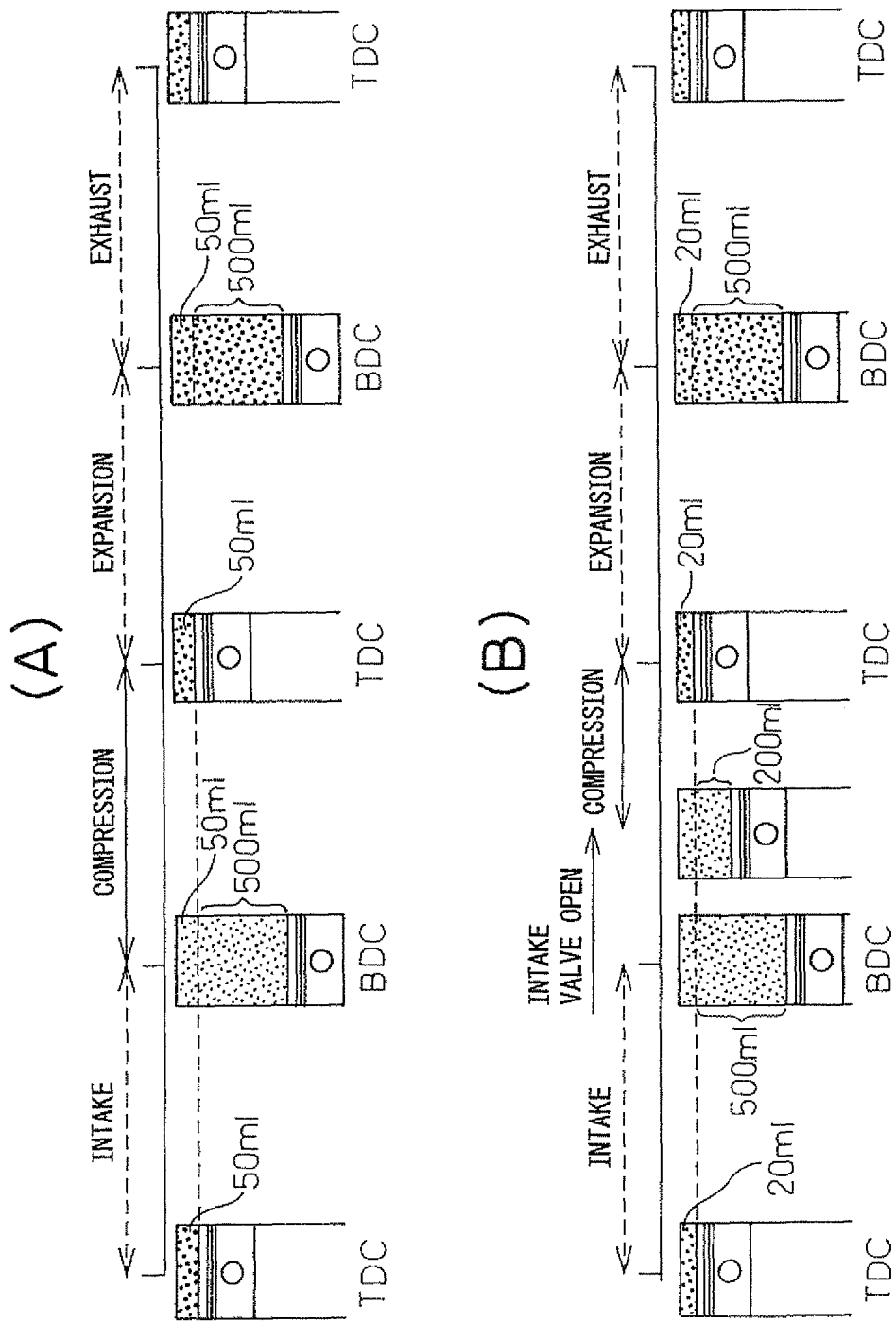
FIG. 8 is a view for explaining an ordinary cycle and superhigh expansion ratio cycle.

The solid line in FIG. 7 shows the change in the theoretical thermal efficiency in the case where the actual combustion ratio and expansion ratio are substantially equal, that is, in the ordinary cycle. In this case, it is learned that the larger the expansion ratio, that is, the higher the actual combustion ratio, the higher the theoretical thermal efficiency. Therefore, in an ordinary cycle, to raise the theoretical thermal efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual combustion ratio and studied the theoretical thermal efficiency and as a result discovered that in the theoretical thermal efficiency, the expansion ratio is dominant, and the theoretical thermal efficiency is not affected much at all by the actual combustion ratio. That is, if raising the actual combustion ratio, the explosive force rises, but compression requires a large energy, accordingly even if raising the actual combustion ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line ε=10 in FIG. 7 shows the theoretical thermal efficiency in the case of fixing the actual combustion ratio at 10 and raising the expansion ratio in that state. In this way, it is learned that the amount of rise of the theoretical thermal efficiency when raising the expansion ratio in the state where the actual combustion ratio is maintained at a low value and the amount of rise of the theoretical thermal efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual combustion ratio at a low value while raising the expansion ratio.

Referring to FIG. 8(B), in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8(A), as explained above, the actual combustion ratio is about 11 and the expansion ratio is 11. Compared with this case, in the case shown in FIG. 8(B), it is learned that only the expansion ratio is raised to 26. This is the reason that it is called the superhigh expansion ratio cycle.

Generally speaking, in an internal combustion engine, the lower the engine load, the worse the thermal efficiency, therefore to improve the thermal efficiency at the time of vehicle operation, that is, to improve the fuel efficiency, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be taken into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is used, while at the time of engine high load operation, the ordinary cycle shown in FIG. 8(A) is used.

Next, the operational control as a whole will be explained with reference to FIG. 9.

Figure 9:
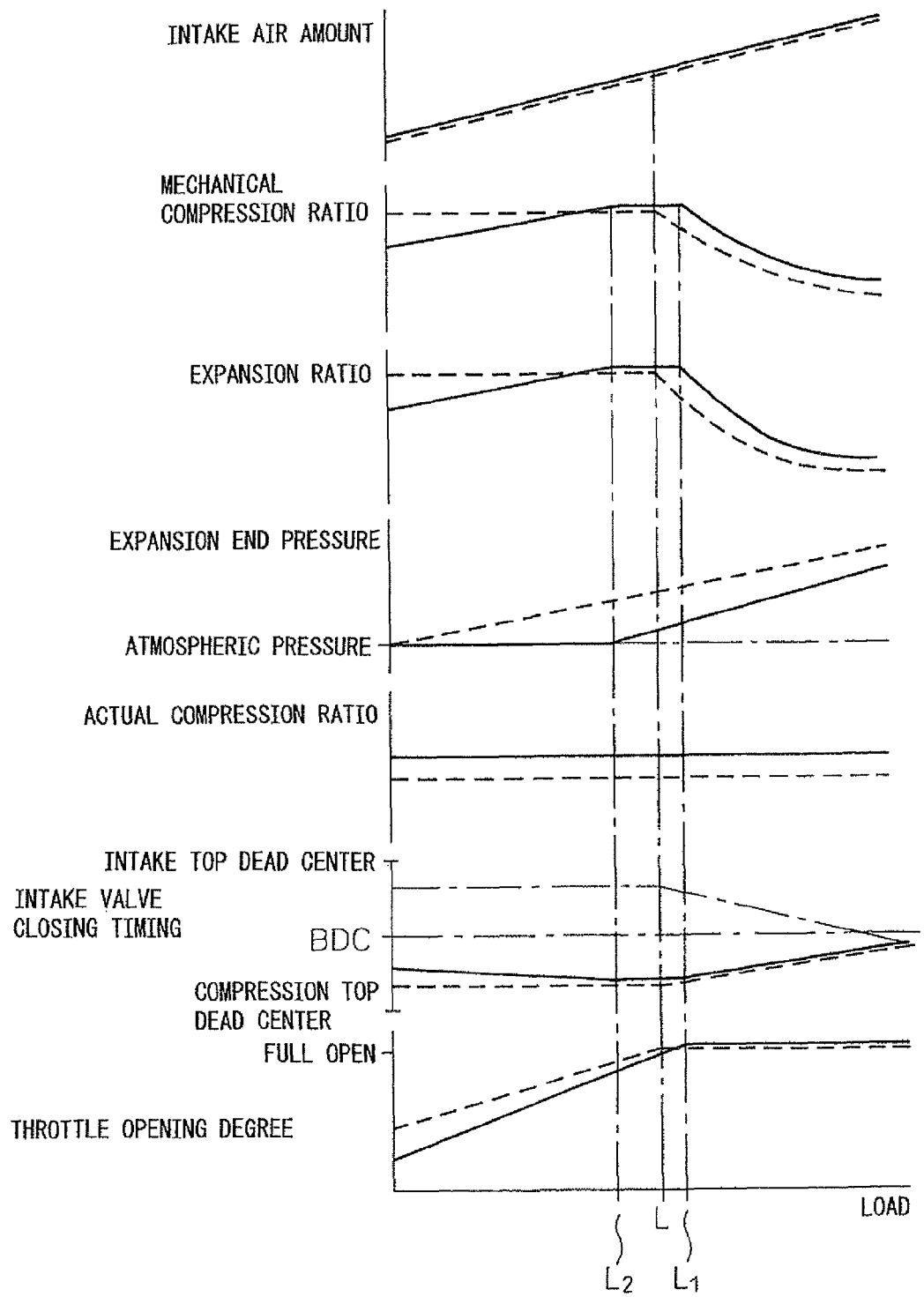
FIG. 9 is a view which shows the changes in the mechanical compression ratio etc. in accordance with the engine load.

FIG. 9 shows the changes in the intake air amount, mechanical compression ratio, expansion ratio, expansion end pressure, actual compression ratio, closing timing of the intake valve 7, and opening degree of the throttle valve 17 in accordance with the engine load at a certain engine speed. Note that in FIG. 9, the broken lines show the case of use of gasoline as the fuel, while the solid lines show the case of use of an alcohol-containing fuel with a certain alcohol concentration as the fuel. Further, in this embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_X$ in the exhaust gas.

First, if explaining the case as shown by the broken lines in FIG. 9, that is, the case of using gasoline as fuel, at the time of engine high load operation, as explained above, the ordinary cycle which is shown in FIG. 8(A) is executed. Therefore, at this time, as shown in FIG. 9, the mechanical compression ratio is lowered, so the expansion ratio is low. As shown in FIG. 9 by the broken lines, the closing timing of the intake valve 7 is advanced as shown by the solid line in FIG. 5. Further, at this time, the amount of intake air is large. At this time, the opening degree of the throttle valve 17 is held full open or substantially full open.

On the other hand, as shown in FIG. 9 by the broken lines, if the engine load becomes lower, the closing timing of the intake valve 7 is retarded along with this to reduce the amount of intake air. Further, at this time, as shown in FIG. 9, the mechanical compression ratio is increased as the engine load becomes lower so that the actual compression ratio is held substantially constant, therefore the expansion ratio also is increased as the engine load becomes lower. Note that, at this time as well, the throttle valve 17 is held in the full open or substantially full open state, therefore the amount of intake air which is fed into the combustion chamber 5 is controlled without relying on the throttle valve 17 by changing the closing timing of the intake valve 7.

When the engine load becomes lower from the engine high load operating state in this way, the mechanical compression ratio is made to increase along with the decrease in the amount of intake air under a substantially constant actual compression ratio. That is, the volume of the combustion chamber 5 when the piston 4 reaches compression top dead center is made to decrease in proportion to the decrease of the amount of intake air. Therefore, the volume of the combustion chamber 5 when the piston 4 reaches compression top dead center changes in proportion to the amount of intake air. Note that at this time, the air-fuel ratio inside the combustion chamber 5 becomes the stoichiometric air-fuel ratio, so the volume of the combustion chamber 5 when the piston 4 reaches compression top dead center changes in proportion to the amount of fuel.

If the engine load becomes further lower, the mechanical compression ratio is made to further increase. If the engine load falls to a certain load L of the medium load region, the mechanical compression ratio reaches the limit mechanical compression ratio forming the structural limit of the combustion chamber 5. If the mechanical compression ratio reaches the limit mechanical compression ratio, in the region where the load is lower than the engine load L when the mechanical compression ratio reaches the mechanical compression ratio, the mechanical compression ratio is held at the limit mechanical compression ratio. Therefore, at the time of low load side engine medium load operation and at the time of engine low load operation, that is, at the engine low load operation side, the mechanical compression ratio becomes maximum and the expansion ratio also becomes maximum. In other words, at the engine low load operation side, the mechanical compression ratio is made the maximum so that the maximum expansion ratio is obtained.

On the other hand, in the example which is shown in FIG. 9, if the engine load falls to the load L, the closing timing of the intake valve 7 becomes the limit closing timing at which the amount of intake air which is fed into the combustion chamber 5 can be controlled. If the closing timing of the intake valve 7 reaches the limit closing timing, in the region of a load lower than the engine load L when the closing timing of the intake valve 7 reaches the limit closing timing, the closing timing of the intake valve 7 is held at the limit closing timing. If the engine load becomes the load L or less, the mechanical compression ratio and the closing timing of the intake valve 7 are held constant in this way, so the actual compression ratio is held constant.

If the closing timing of the intake valve 7 is held at the limit closing timing, a change of the closing timing of the intake valve 7 will not longer be able to be used to control the amount of intake air. In the embodiment which is shown in FIG. 9, at this time, in the region where the load is lower than the engine load L when the closing timing of the intake valve 7 reaches the limit closing timing, the throttle valve 17 is used to control the amount of intake air which is fed into the combustion chamber 5. The lower the engine load becomes, the smaller the opening degree of the throttle valve 17 is made.

Further, if the engine load falls, the combustion pressure falls, so the expansion end pressure also falls. Therefore, as shown in FIG. 9 by the broken line, along with a fall in the engine load, the expansion end pressure also falls. In this case, the expansion end pressure falls the most when the engine load falls the most, but as will be understood from FIG. 9, even when the expansion end pressure falls the most, the expansion end pressure will not become less than the atmospheric pressure.

On the other hand, as shown in FIG. 9 by the one-dot and dash line, by advancing the closing timing of the intake valve 7 along with a fall in the engine load, it is also possible to control the amount of intake air without relying on the throttle valve 17. Therefore, if expressed to be able to encompass both the case which is shown by the broken line and the case which is shown by the one-dot and dash line in FIG. 9, in the example which is shown in FIG. 9, the closing timing of the intake valve 7 is made to move, as the engine load becomes lower, in a direction away from intake bottom dead center BDC until the limit closing timing L at which the amount of intake air which is fed into a combustion chamber can be controlled. In this way, the amount of intake air can also be controlled by making the closing timing of the intake valve 7 change as shown in FIG. 9 by the broken line and can be controlled by making it change as shown by the one-dot and dash line, but below, the case of making the closing timing of the intake valve 7 change as shown in FIG. 9 by the broken line will be explained as an example.

In this regard, as explained before, in the superhigh expansion ratio cycle which is shown in FIG. 8(B), the expansion ratio is made 26. The higher this expansion ratio, the more preferable, but as will be understood from FIG. 7, even for the practical by usable lower limit actual compression ratio $\epsilon=5$, if 20 or more, a considerably high theoretical thermal efficiency can be obtained. Therefore, in the present invention, the variable compression ratio mechanism A is formed so that the expansion ratio becomes 20 or more.

Figure 10:
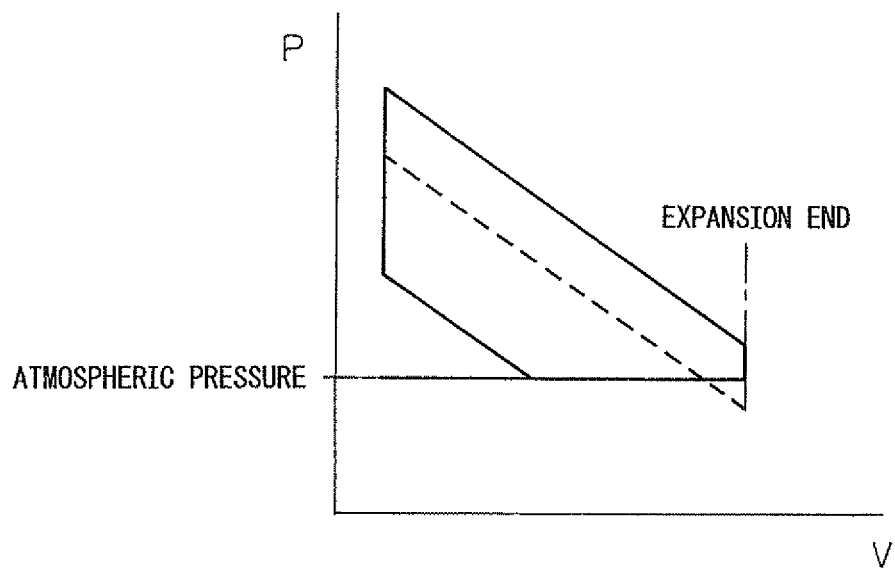
FIG. 10 is a PV graph.

FIG. 10 is a PV graph which shows logarithmically both the volume V of the combustion chamber 5 and a pressure P of the combustion chamber 5. In FIG. 10, the solid line shows the relationship between the volume V and the pressure P at the time of engine low load operation in the case of use of gasoline as the fuel. As shown in FIG. 10 by the solid line, it is learned that when gasoline is used as the fuel, even at the time of engine low load operation, the expansion end pressure will be the atmospheric pressure or more. In this regard, when using a fuel which contains alcohol as the fuel like in the present invention, sometimes the expansion end pressure ends up becoming the atmospheric pressure or less.

That is, if making a fuel like alcohol which contains oxygen burn, a large amount of water with a large specific heat will be produced compared with when making usual gasoline burn. As a result, the combustion temperature will fall and the combustion pressure will fall. If the combustion pressure falls, the expansion end pressure falls and as a result, as shown in FIG. 10 by the broken line, sometimes the expansion end pressure ends up becoming less than the atmospheric pressure, that is, sometimes over expansion ends up occurring. However, if over expansion occurs in this way, the heat efficiency will greatly fall, so it is necessary to prevent such over expansion from occurring.

In this regard, when using a fuel which contains alcohol as the fuel, the higher the alcohol concentration in the fuel, the more the combustion pressure falls and the more the expansion end pressure falls. On the other hand, the expansion end pressure rises as the expansion ratio is made to fall. Therefore, to prevent over expansion, it is sufficient to make the expansion ratio fall the higher the alcohol concentration in the fuel. Therefore, in the present invention, when the alcohol concentration in the fuel is high, the expansion ratio at the time of engine low load operation is made to fall compared to when the alcohol concentration in the fuel is low.

Figure 11:
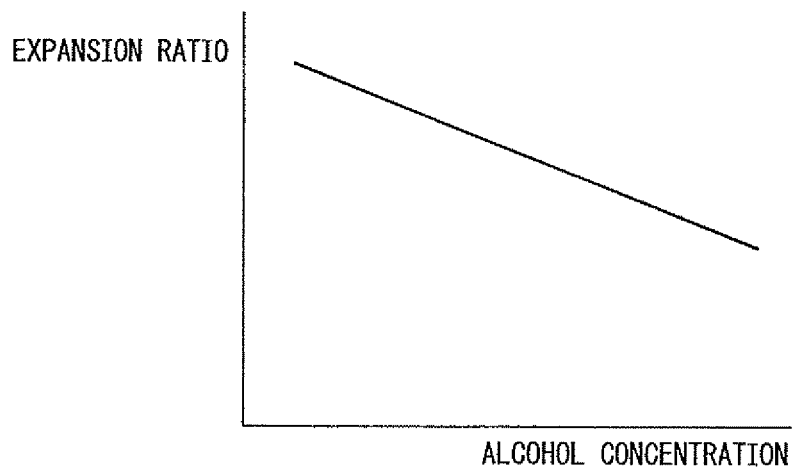
FIG. 11 is a view which shows the relationship between an alcohol concentration and the expansion ratio.
Figure 12:
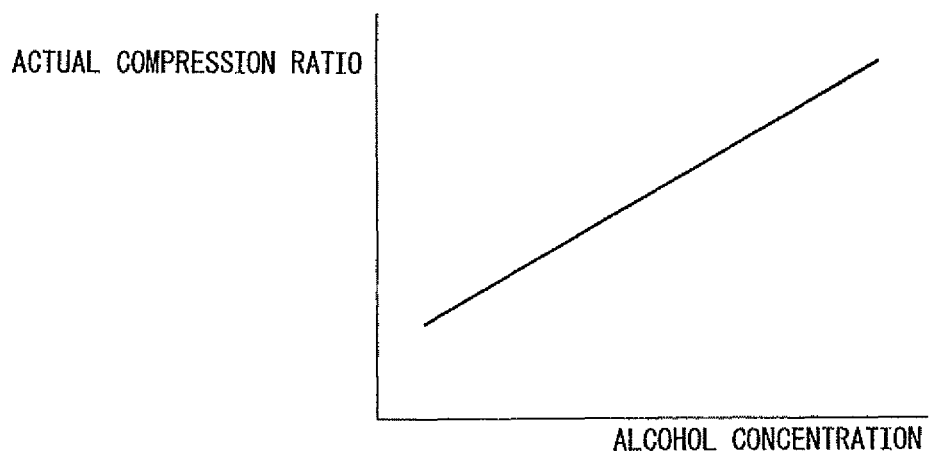
FIG. 12 is a view which shows the relationship between the alcohol concentration and the actual compression ratio.

Note that, in this embodiment according to the present invention, as shown in FIG. 11, the expansion ratio is made higher as the alcohol concentration in the fuel becomes higher. Further, the higher the alcohol concentration in the fuel becomes, the harder it is for knocking to occur, therefore, it is possible to raise the actual compression ratio the higher the alcohol concentration in the fuel. Therefore, in the present invention, when the alcohol concentration in the fuel is high, the actual compression ratio is made higher compared with when the alcohol concentration in the fuel is low. In this case, in the embodiment according to the present invention, as shown in FIG. 12, the higher the alcohol concentration in the fuel, the greater the actual compression ratio.

Now, to make the expansion ratio fall, there are two methods: the method of making the mechanical compression ratio fall and the method of advancing the opening timing of the exhaust valve 9. The solid lines of FIG. 9 show the changes in the mechanical compression ratio etc. in the case of making the mechanical compression ratio fall to thereby make the expansion ratio fall at the time of engine low load operation. Note that the solid line of FIG. 9 shows the case where fuel which contains a certain concentration of alcohol is used as the fuel and where the actual compression ratio is raised across the board without regard as to the engine load.

Referring to FIG. 9, as shown by the solid line, at the time of engine high load operation, the mechanical compression ratio is made higher by exactly the amount by which the actual compression ratio is made higher.

Therefore, at this time, the expansion ratio also becomes higher than the case which is shown by the broken lines, that is, the case of using gasoline. On the other hand, at this time, the expansion end pressure becomes lower compared with the case of using gasoline. Further, at this time, the throttle valve 17 is held in the full open or substantially full open state.

If the engine load becomes lower, as shown in FIG. 9 by the solid line, the closing timing of the intake valve 7 is retarded to decrease the amount of intake air. Further, at this time, the mechanical compression ratio is made to increase as the engine load becomes lower so that the actual compression ratio is held substantially constant, therefore the expansion ratio is also increased as the engine load becomes lower. Note that at this time as well, the throttle valve 17 is held full open or substantially full open in state, therefore the amount of intake air which is fed into the combustion chamber 5 is controlled, without relying on the throttle valve 17, by changing the closing timing of the intake valve 7. Further, at this time, the expansion end pressure gradually falls.

Next, if the engine load becomes further lower, the mechanical compression ratio is further made to increase. If the engine load falls to the load $L_1$ (>L), the mechanical compression ratio reaches the maximum mechanical compression ratio. On the other hand, in the example which is shown in FIG. 9, if the engine load falls to $L_1$, the closing timing of the intake valve 7 becomes the limit closing timing at which the amount of intake air which is fed into a combustion chamber 5 can be controlled. If the closing timing of the intake valve 7 reaches the limit closing timing, the change of the closing timing of the intake valve 7 can no longer be used to control the amount of intake air, therefore at this time the throttle valve 17 is used to control the amount of intake air which flows into the combustion chamber 5. If the engine load becomes lower than $L_1$, the lower the engine load becomes, the smaller the opening degree of the throttle valve 17 is made.

On the other hand, in the example which is shown in FIG. 9, as shown by the solid line, if the engine load falls to $L_2$ (<L), the expansion end pressure falls down to atmospheric pressure. Therefore, at the time of low load operation where the engine load is lower than the load $L_2$ where the expansion end pressure becomes the atmospheric pressure, the expansion ratio is made to fall by decreasing the mechanical compression ratio. As will be understood from FIG. 9, at the time of engine low load operation, if the expansion ratio is held constant, the expansion end pressure will rapidly fall down to less than atmospheric pressure along with the fall in the engine load. To prevent the expansion end pressure from becoming less than the atmospheric pressure at this time, it is necessary to make the expansion ratio fall when the engine load falls.

Therefore, in the present invention, at the time of engine low load operation, the amount of fall of the expansion ratio is made larger at the engine low load side compared with the engine high load side. Note that, in this case, in the example which is shown in FIG. 9, as the engine load becomes lower, the mechanical compression ratio is made to become lower and along with this the expansion ratio is made to become lower. On the other hand, in the example which is shown in FIG. 9, at the engine low load operation region where the engine load is lower than $L_2$, to maintain the actual compression ratio constant, the closing timing of the intake valve 7 is advanced as the mechanical compression ratio is made to fall. At this time, the opening degree of the throttle valve 17 is made to close more compared with when using gasoline so that the amount of intake air becomes the required amount of intake air corresponding to the load.

In an embodiment according to the present invention, the closing timing of the intake valve 7, mechanical compression ratio, and opening degree of the throttle valve 17 become functions of the concentration of ammonia in the fuel in addition to the engine load and engine speed. In the embodiment according to the present invention, a plurality of maps of the closing timing IC of the intake valve 7 such as shown in FIG. 13(A) are stored for various alcohol concentrations as functions of the engine load L and engine speed N in advance in the ROM 32, a plurality of maps of the mechanical compression ratio CA such as shown in FIG. 13(B) are stored for various alcohol concentrations as functions of the engine load L and engine speed N in advance in the ROM 32, and a plurality of maps of the opening degree θ of the throttle valve 17 such as shown in FIG. 13(C) are stored for various alcohol concentrations as functions of the engine load L and engine speed N in advance in the ROM 32.

Figure 14:
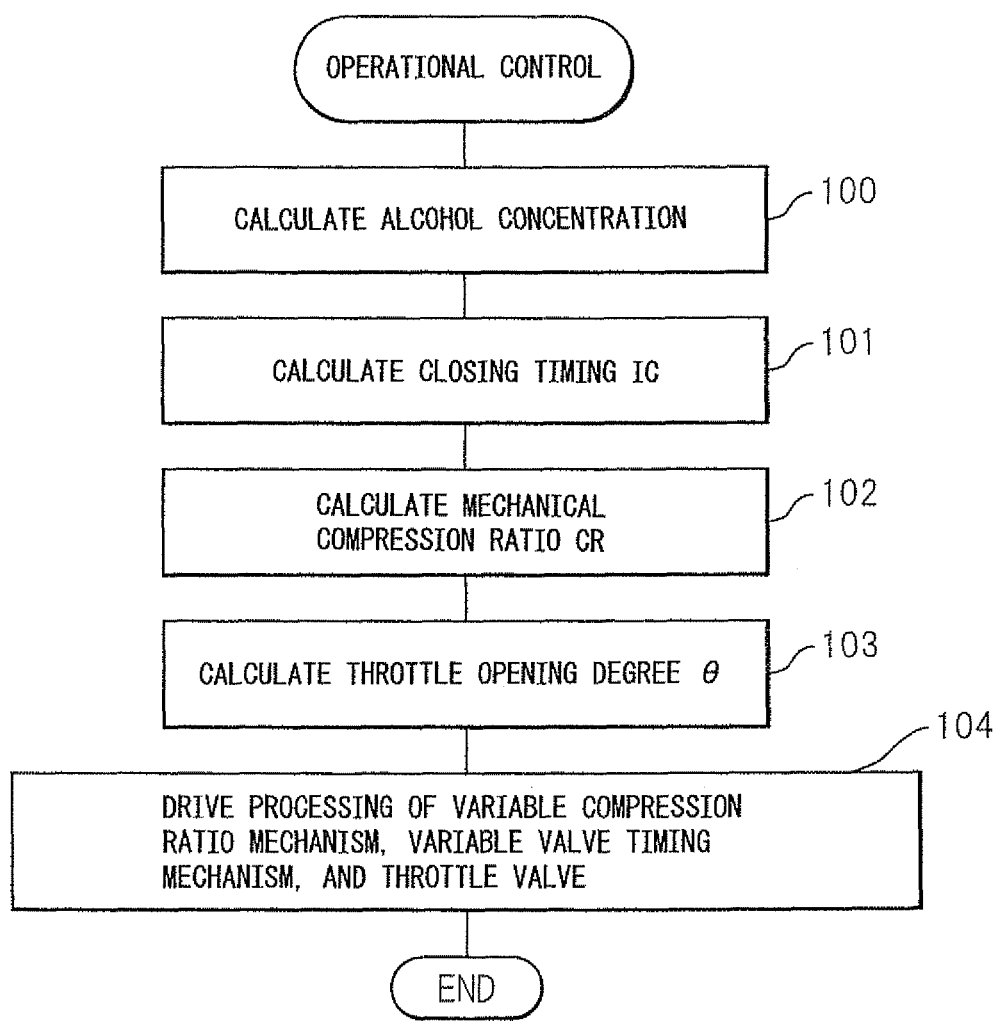
FIG. 14 is a flowchart for operational control.

FIG. 14 shows an operational control routine. Referring to FIG. 14, first, at step 100, the alcohol concentration sensor 23 is used to detect the alcohol concentration in the fuel which is fed into the combustion chamber 5. Next, at step 101, the closing timing IC of the intake valve 7 is calculated from the map which is shown in FIG. 13(A) in accordance with the detected alcohol concentration, next, at step 102, the mechanical compression ratio CR is calculated from the map which is shown in FIG. 13(B) in accordance with the detected alcohol concentration, next, at step 103, the opening degree of the throttle valve 17 is calculated from the map which is shown in FIG. 13(C) in accordance with the detected alcohol concentration. Next, at step 104, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

Figure 15:
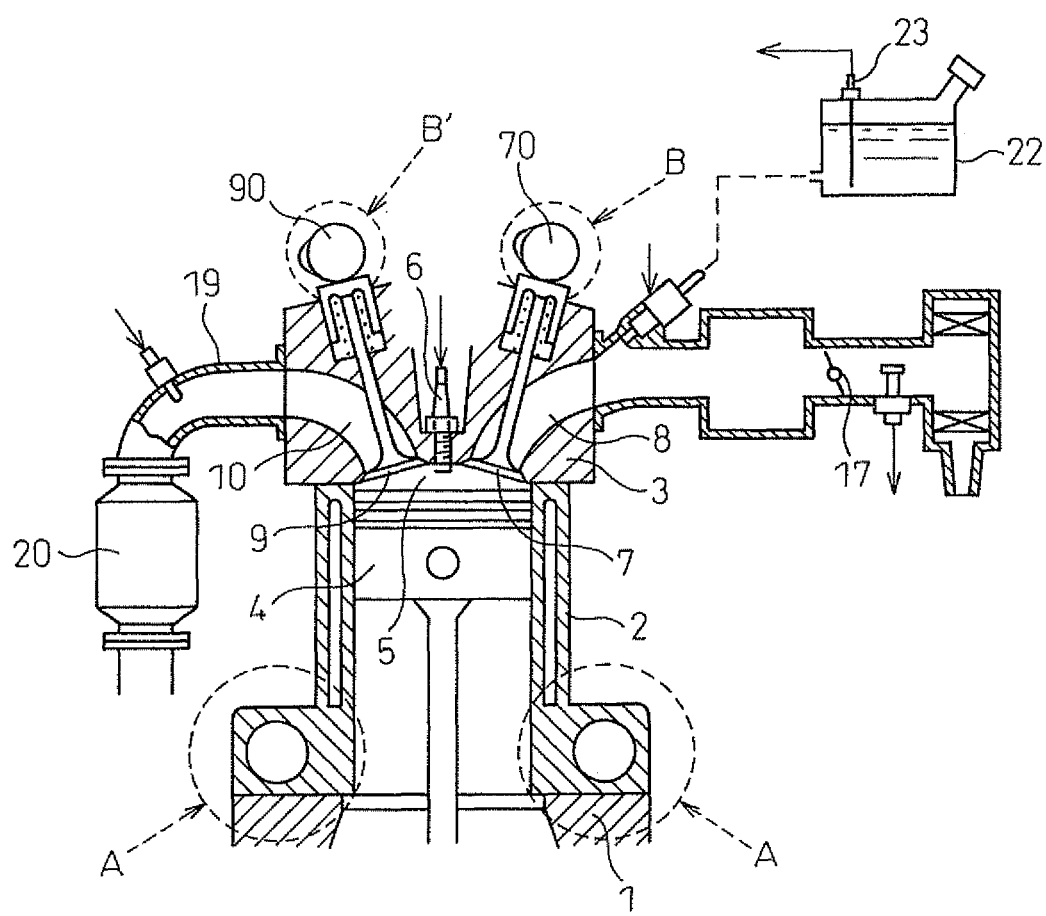
FIG. 15 is an overall view which shows another embodiment of a spark ignition type internal combustion engine.

FIG. 15 shows another embodiment. In this embodiment, to control the opening timing of the exhaust valve 9, a variable valve timing mechanism B' which has a structure similar to the variable valve timing mechanism B is provided for a cam shaft 90 which drives the exhaust valve 9. In this embodiment, the expansion ratio at the time of engine low load operation is made to fall by advancing the opening timing of the exhaust valve 9 by the variable valve timing mechanism B'.

Figure 16:
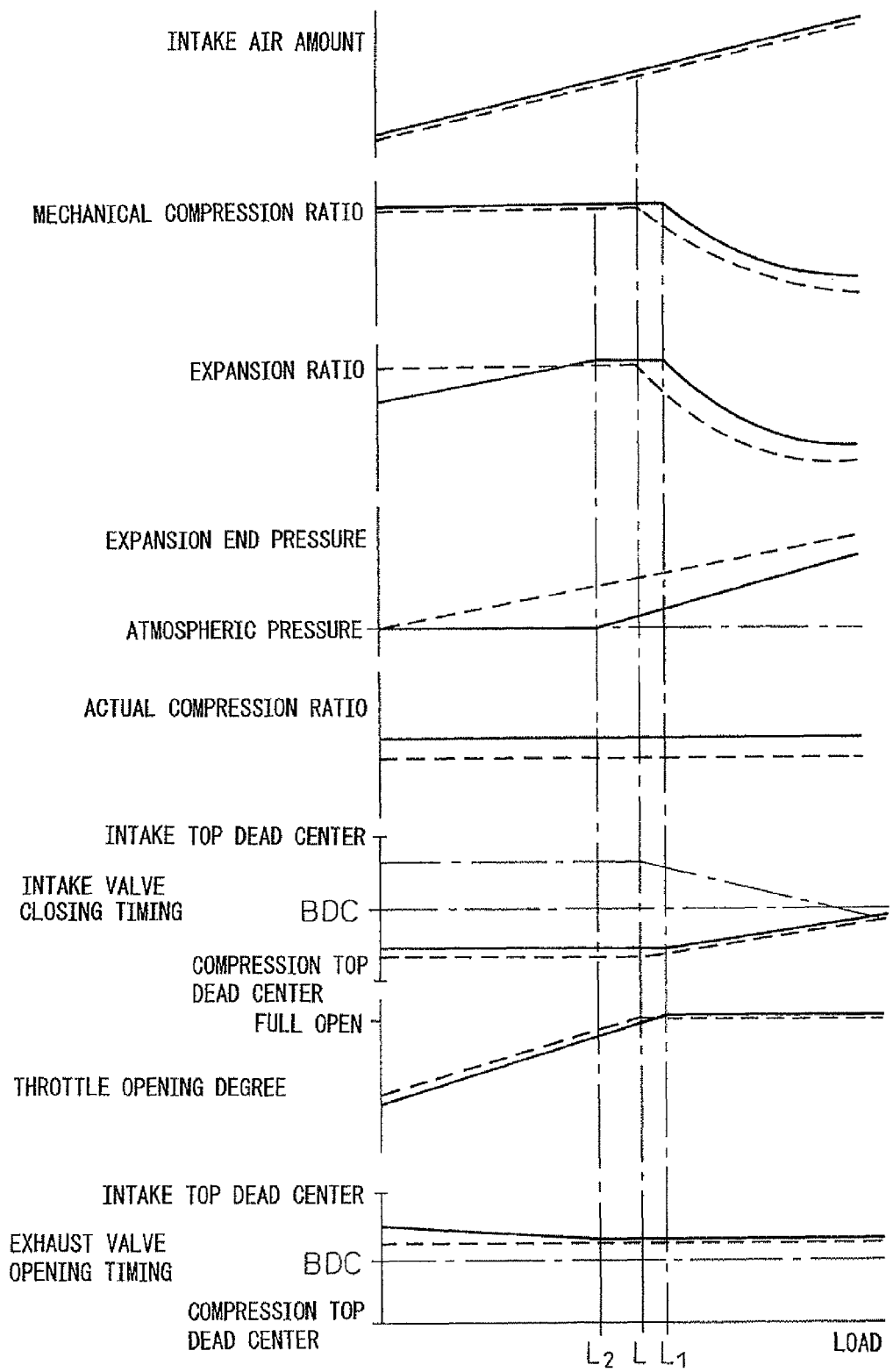
FIG. 16 is a view which shows the changes in mechanical compression ratio etc. in accordance with the engine load.

The broken lines of FIG. 16, in the same way as in FIG. 9, show when gasoline is used as the fuel, while the solid lines of FIG. 16 show the case of using alcohol-containing fuel with a certain alcohol concentration as the fuel. As shown by the solid line in FIG. 16, as in this embodiment, in the engine low load operation region where the engine load is lower than the load $L_2$ at which the expansion end pressure becomes the atmospheric pressure, the opening timing of the exhaust valve 9 is advanced compared with when using gasoline, that is, the case which is shown by the broken lines. If the opening timing of the exhaust valve 9 is advanced, the expansion ratio falls.

Figure 17:
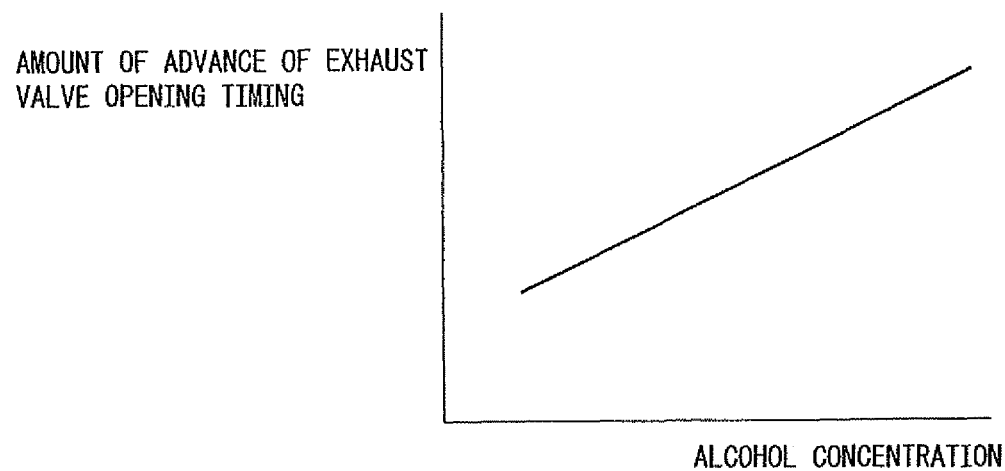
FIG. 17 is a view which shows the relationship between the alcohol concentration and an amount of advance of an exhaust valve opening timing.

In this case, in the embodiment according to the present invention, as shown in FIG. 17, the higher the alcohol concentration in the fuel, the more the amount of advance of the opening timing of the exhaust valve 9 is increased. Further, as will be understood from the solid lines of FIG. 16, at the time of engine low load operation, the more the engine load falls, the more the amount of advance of the opening timing of the exhaust valve 9 is increased, therefore the more the engine load falls, the more the expansion ratio is lowered. Note that, in this embodiment, at the time of engine low load operation, the mechanical compression ratio is maintained at the maximum mechanical compression ratio, while the closing timing of the intake valve 7 is held at the limit closing timing.

In this embodiment as well, the closing timing of the intake valve 7, the mechanical compression ratio, and the opening degree of the throttle valve 17 become functions of the concentration of ammonia in the fuel in addition to the engine load and engine speed. These closing timing of the intake valve 7, mechanical compression ratio, and opening degree of the throttle valve 17 are stored in advance with respect to various alcohol concentrations in the form of the maps such as shown in FIGS. 13(A), (B), and (C).

Further, in this embodiment, the opening timing of the exhaust valve 9 also becomes a function of the ammonia concentration in the fuel in addition to the engine load and engine speed. Therefore, in this embodiment, a plurality of maps of the opening timing EO of the exhaust valve 9 such as shown in FIG. 18 are stored for various alcohol concentrations as functions of the engine load L and engine speed N in advance in the ROM 32.

Figure 19:
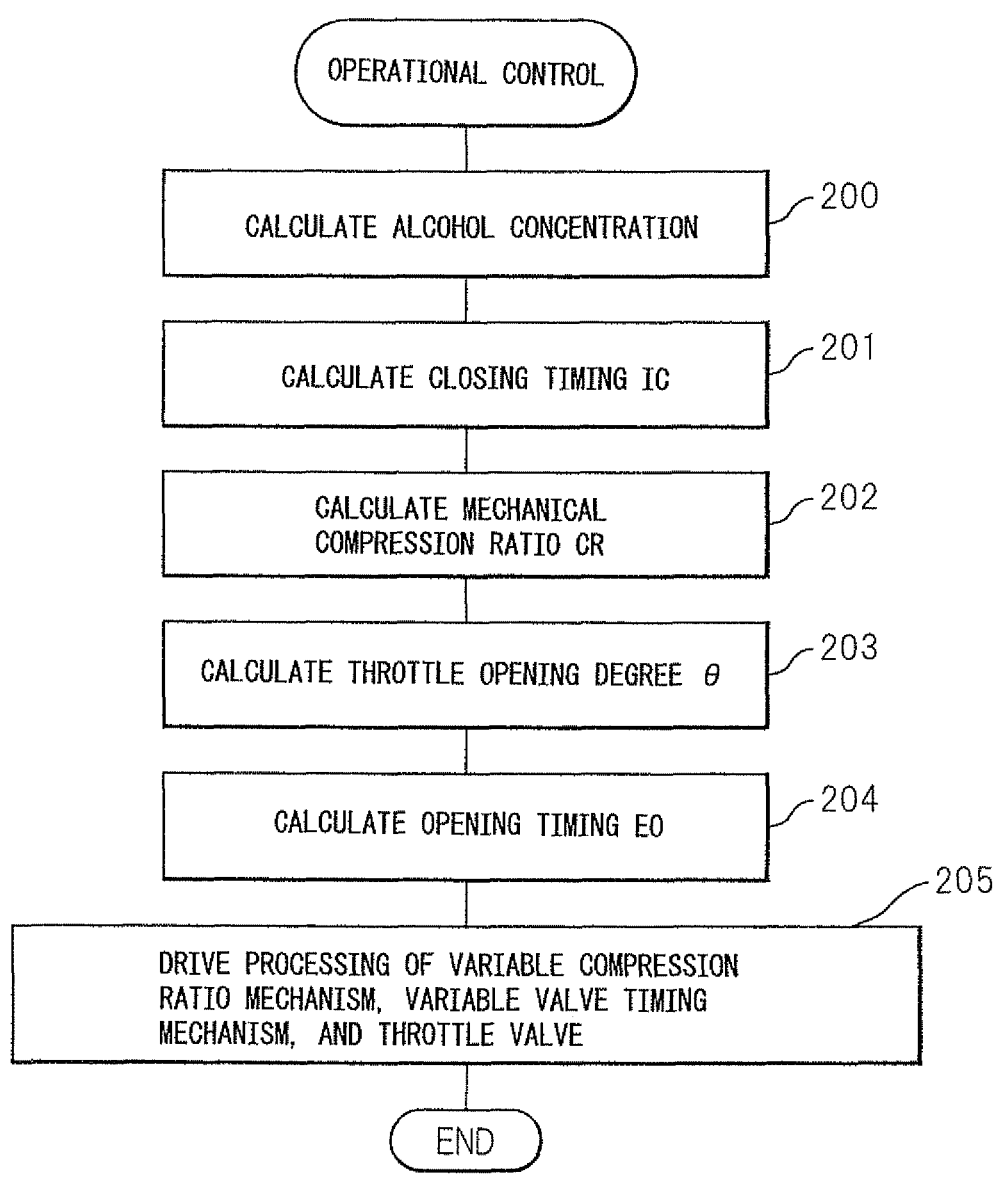
FIG. 19 is a flowchart for operational control.

FIG. 19 shows an operational control routine. Referring to FIG. 19, first, at step 200, the alcohol concentration sensor 23 is used to detect the alcohol concentration in the fuel which is fed into the combustion chamber 5. Next, at step 201, the closing timing IC of the intake valve 7 is calculated from the map such as shown in FIG. 13(A) in accordance with the detected alcohol concentration, next, at step 202, the mechanical compression ratio CR is calculated from the map such as shown in FIG. 13(B) in accordance with the detected alcohol concentration, next, at step 103, the opening degree of the throttle valve 17 is calculated from the map such as shown in FIG. 13(C) in accordance with the detected alcohol concentration.

Figure 18:
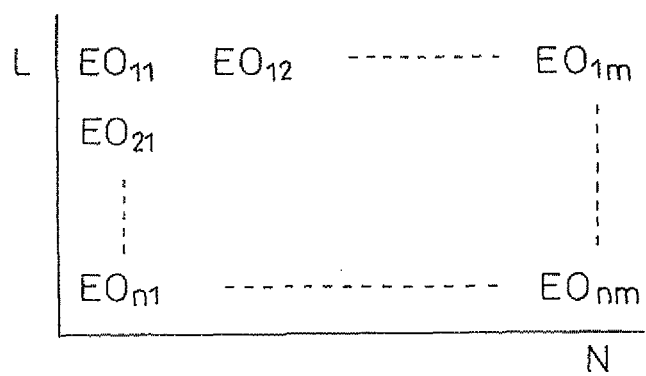
FIG. 18 is a view which shows a map of an exhaust valve opening timing EO.

Next, at step 204, the opening timing EO of the exhaust valve 9 is calculated from the map which is shown in FIG. 18 in accordance with the detected alcohol concentration. Next, at step 205, the variable compression ratio mechanism A is controlled so that the mechanical compression ratio becomes the mechanical compression ratio CR, the variable valve timing mechanism B is controlled so that the closing timing of the intake valve 7 becomes the closing timing IC, the throttle valve 17 is controlled so that the opening degree of the throttle valve 17 becomes the opening degree θ, and the variable valve timing mechanism B' is controlled so that the opening timing of the exhaust valve 9 becomes EO.

Figure 20:
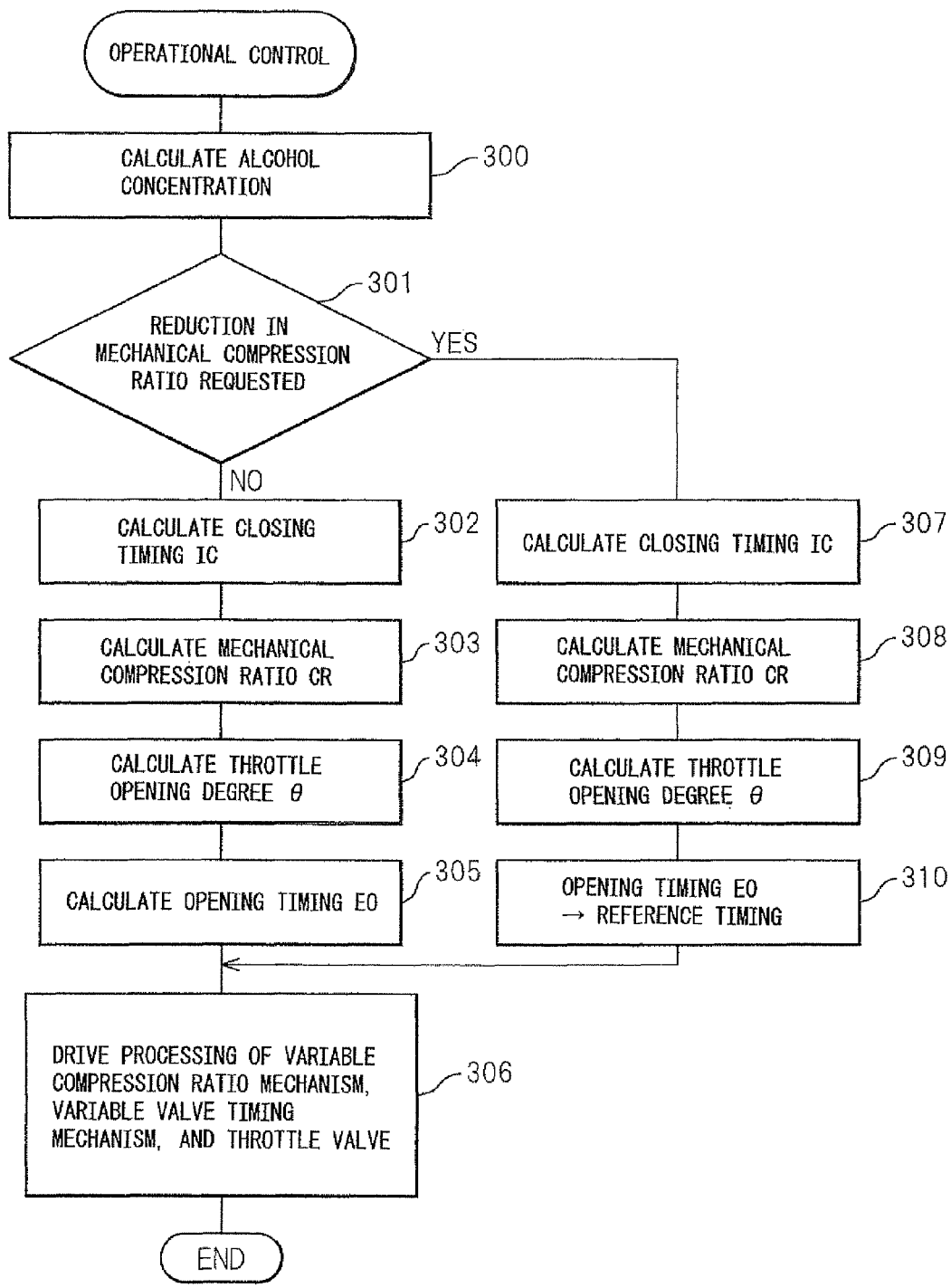
FIG. 20 is a flowchart for operational control.

FIG. 20 shows still another embodiment. In this embodiment, usually the expansion ratio at the time of engine low load operation is lowered by advancing the opening timing of the exhaust valve 9. When there is a request to lower the mechanical compression ratio, the expansion ratio at the time of engine low load operation is lowered by lowering the mechanical compression ratio.

That is, as will be understood if comparing FIG. 9 and FIG. 16, the opening degree of the throttle valve 17 at the time of engine low load operation is made smaller in the case which is shown in FIG. 9 compared with the case which is shown in FIG. 16, therefore the pumping loss becomes larger in the case which is shown in FIG. 9 compared with the case which is shown in FIG. 16. Therefore, if considering the thermal efficiency, as shown in FIG. 16, it is preferable to make the expansion ratio fall by advancing the opening timing EO of the exhaust valve 9. Therefore, in this example, usually the expansion ratio is made to fall by advancing the opening timing EO of the exhaust valve 9.

However, sometimes a request is issued to lower the mechanical compression ratio. That is, when the mechanical compression ratio can be changed, the higher the mechanical compression ratio becomes, the flatter the combustion chamber 5 becomes. As a result, the higher the mechanical compression ratio, the harder it becomes for fuel in the peripheral parts of the combustion chamber 5 to burn and therefore the easier it becomes for unburned HC to be produced. Therefore, for example, at this time, when desiring to lower the amount of production of unburned HC, it is preferable to lower the mechanical compression ratio. In such a case, a request is issued to lower the mechanical compression ratio.

As one example of the case where a request is issued to lower the mechanical compression ratio in this way, the time of engine startup or the time of engine warmup operation may be mentioned. That is, at the time of engine startup and at the time of engine warmup operation, usually the catalyst 20 is not activated, therefore if unburned HC flows into the catalyst 20 at this time, the unburned HC slips through the catalyst 20 without being removed at the catalyst 20. Therefore at the time of engine startup or at the time of engine warmup operation, it is preferable to make the amount of exhaust of unburned HC from the combustion chamber 5 fall. Therefore, in this example, at the time of engine startup or at the time of engine warmup operation, a request is issued to lower the mechanical compression ratio. In this embodiment, when a request is issued to lower the mechanical compression ratio in this way, the mechanical compression ratio is made to fall to thereby make the expansion ratio fall.

Referring to the operational control routine which is shown in FIG. 20, first, at step 300, the alcohol concentration sensor 23 is used to detect the alcohol concentration in the fuel which is fed into the combustion chamber 5. Next, at step 301, it is judged if a request has been issued to lower the mechanical compression ratio. If no request has been issued to lower the mechanical compression ratio, the routine proceeds to step 302 where the mechanical compression ratio etc. are controlled as shown by the solid lines of FIG. 16.

That is, at step 302, the closing timing IC of the intake valve 7 is calculated from the map such as shown in FIG. 13(A) in accordance with the detected alcohol concentration, next, at step 303, the mechanical compression ratio CR is calculated from the map such as shown in FIG. 13(B) in accordance with the detected alcohol concentration, next, at step 304, the opening degree of the throttle valve 17 is calculated from the map such as shown in FIG. 13(C) in accordance with the detected alcohol concentration. Next, at step 305, the opening timing EO of the exhaust valve 9 is calculated from the map which is shown in FIG. 18 in accordance with the detected alcohol concentration.

Next, at step 306, the variable compression ratio mechanism A is controlled so that the mechanical compression ratio becomes the mechanical compression ratio CR, the variable valve timing mechanism B is controlled so that the closing timing of the intake valve 7 becomes the closing timing IC, the throttle valve 17 is controlled so that the opening degree of the throttle valve 17 becomes the opening degree θ, and the variable valve timing mechanism B' is controlled so that the opening timing of the exhaust valve 9 becomes EO.

On the other hand, when it is judged at step 301 that a request has been issued to lower the mechanical compression ratio, the routine proceeds to step 307 where, as shown by the solid line of FIG. 9, the mechanical compression ratio etc. are controlled.

That is, at step 307, the closing timing IC of the intake valve 7 is calculated from the map which is shown in FIG. 13(A) in accordance with the detected alcohol concentration, next, at step 308, the mechanical compression ratio CR is calculated from the map which is shown in FIG. 13(B) in accordance with the detected alcohol concentration, next, at step 309, the opening degree of the throttle valve 17 is calculated from the map which is shown in FIG. 13(C) in accordance with the detected alcohol concentration. Next, at step 310, the opening timing EO of the exhaust valve 9 is fixed at the reference timing, then the routine proceeds to step 306. At this time, at step 306, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

REFERENCE SIGNS LIST

1 . . . crank case
2 . . . cylinder block

3 ... cylinder head
4 ... piston
5 ... combustion chamber
7 ... intake valve
23 ... alcohol concentration sensor
70 ... cam shaft for driving intake valve
A ... variable compression ratio mechanism
B ... variable valve timing mechanism

The invention claimed is:

1. A spark ignition type internal combustion engine comprising:
   a variable compression ratio mechanism configured to change a mechanical compression ratio; and
   a variable valve timing mechanism configured to control a closing timing of an intake valve, and an expansion ratio increases such that the expansion ratio is higher at the time of engine low load operation than the expansion ratio at the time of engine high load operation, wherein:
   a fuel containing alcohol is used as a fuel, and
   the expansion ratio at the time of engine low load operation decreases when an alcohol concentration in the fuel increases, and the expansion ratio increases when the alcohol concentration in the fuel decreases.

2. A spark ignition type internal combustion engine as claimed in claim 1, wherein an actual compression ratio increases when the alcohol concentration in the fuel increases and the actual compression ratio decreases the alcohol concentration in the fuel decreases.

3. A spark ignition type internal combustion engine as claimed in claim 1, wherein when the expansion ratio at the time of engine low load operation decreases, a decrease of the expansion ratio is made higher at the engine low load side than a decrease of the expansion ratio at the engine high load side.

4. A spark ignition type internal combustion engine as claimed in claim 1, wherein the expansion ratio at the time of engine low load operation decreases by lowering the mechanical compression ratio.

5. A spark ignition type internal combustion engine as claimed in claim 1, wherein the expansion ratio at the time of engine low load operation decreases by advancing an opening timing of an exhaust valve.

6. A spark ignition type internal combustion engine as claimed in claim 1, wherein the expansion ratio at the time of engine low load operation decreases by advancing an opening timing of an exhaust valve and when there is a request to lower the mechanical compression ratio, the expansion ratio at the time of engine low load operation decreases by lowering the mechanical compression ratio.

7. A spark ignition type internal combustion engine as claimed in claim 2, wherein when the expansion ratio at the time of engine low load operation decreases, a decrease of the expansion ratio is larger at the engine low load side than a decrease of the expansion ratio at the engine high load side.

8. A spark ignition type internal combustion engine as claimed in claim 2, wherein the expansion ratio at the time of engine low load operation decreases by lowering the mechanical compression ratio.

9. A spark ignition type internal combustion engine as claimed in claim 2, wherein the expansion ratio at the time of engine low load operation decreases by advancing an opening timing of an exhaust valve.

10. A spark ignition type internal combustion engine as claimed in claim 2, wherein the expansion ratio at the time of engine low load operation decreases by advancing an opening timing of an exhaust valve and when there is a request to lower the mechanical compression ratio, the expansion ratio at the time of engine low load operation decreases by lowering the mechanical compression ratio.

* * * * *